United States Patent
Hase et al.

(10) Patent No.: US 7,014,940 B2
(45) Date of Patent: Mar. 21, 2006

(54) HIGH-POLYMER ELECTROLYTE FUEL CELL

(75) Inventors: Nobuhiro Hase, Mino (JP); Hiroki Kusakabe, Sakai (JP); Hideo Ohara, Katano (JP); Shinsuke Takeguchi, Kadoma (JP); Yoshiaki Yamamoto, Katano (JP); Tatsuto Yamazaki, deceased, late of Moriguchi (JP); by Masayo Sugou, legal representative, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 425 days.

(21) Appl. No.: 10/296,513

(22) PCT Filed: Mar. 25, 2002

(86) PCT No.: PCT/JP02/02869

§ 371 (c)(1),
(2), (4) Date: Nov. 26, 2002

(87) PCT Pub. No.: WO02/078108

PCT Pub. Date: Oct. 3, 2002

(65) Prior Publication Data

US 2003/0157387 A1   Aug. 21, 2003

(30) Foreign Application Priority Data

Mar. 26, 2001 (JP) .............................. 2001-086987
Apr. 5, 2001 (JP) .............................. 2001-106731

(51) Int. Cl.
   *H01M 8/00* (2006.01)
   *H01M 2/14* (2006.01)

(52) U.S. Cl. .............................. 429/38; 429/12; 429/34

(58) Field of Classification Search ............. 429/12–46
   See application file for complete search history.

(56) References Cited

U.S. PATENT DOCUMENTS 4,689,280 A  *  8/1987  Gionfriddo .................. 429/34

FOREIGN PATENT DOCUMENTS

| EP | 0 951 086 A2 | 10/1999 |
|---|---|---|
| EP | 0951086 A2 * | 10/1999 |
| JP | 10-255823 A | 9/1998 |
| JP | 10255823 * | 9/1998 |
| JP | 11-162479 A | 6/1999 |
| JP | 11-354138 A | 12/1999 |
| JP | 11-354142 A | 12/1999 |
| JP | 11354138 * | 12/1999 |
| JP | 11354142 * | 12/1999 |
| JP | 2000-021434 A | 1/2000 |
| JP | 2000-133291 | 5/2000 |
| JP | 2000-182640 A | 6/2000 |
| JP | 2000182640 * | 6/2000 |
| JP | 2000-249229 A | 9/2000 |

* cited by examiner

*Primary Examiner*—Patrick Joseph Ryan
*Assistant Examiner*—Melissa Austin
(74) *Attorney, Agent, or Firm*—McDermott Will & Emery LLP (57) ABSTRACT

A fuel cell including a cell stack including plural electrically conductive separator plates and MEAs (electrolyte membrane-electrode assemblies) inserted among the separator plates. The fuel cell further includes gas communication grooves, where the gas communication grooves on one main surface of each separator plate are positioned to correspond to the ribs on the other main surface thereof, whereby thin wall portions in the separator plate can be avoided as much as possible, thereby to solve above described problems.

8 Claims, 8 Drawing Sheets

HIGH-POLYMER ELECTROLYTE FUEL CELL

TECHNICAL FIELD

The present invention relates to a polymer electrolyte fuel cell, particularly to an improvement of electrically conductive separator plates, which are constituting elements thereof.

BACKGROUND ART

It is a fundamental principle, on which a polymer electrolyte membrane fuel cell is based, that a fuel gas containing hydrogen and an oxidant gas, such as oxygen, containing oxygen are electrochemically reacted whereby electric power and heat are generated at the same time, and that the thus generated electric power is taken out. This fuel cell basically comprises a polymer electrolyte membrane for selectively transporting hydrogen ions and a pair of electrodes, i.e. anode and cathode, formed on opposite surfaces thereof. The electrode is structured by a catalyst layer having, as a main component, a carbon powder carrying a platinum metal catalyst and by a gas diffusion layer formed on an outer surface of the catalyst layer and having both gas permeability and electronic conductivity.

Gas sealing members and gaskets to sandwich the polymer electrolyte membrane therebetween are placed at peripheral portions of the electrodes in order to prevent the supplied fuel gas and oxidant gas from leaking to outside and from mixing with each other. The sealing members and the gaskets are preliminarily and integrally assembled with the electrodes and the polymer electrolyte membrane. This is called MEA (electrolyte-electrode assembly). Electrically conductive separators are placed at outer sides of the MEA for mechanically fixing it and for electrically connecting, in series, neighboring MEAs with each other. On a portion of each separator plate to contact with the MEA, a gas flow channel is formed for supplying a reactive gas to the electrode and for carrying away a generated gas and excessive gas. The gas flow channel can be provided separately from the separator plate, but it is a general way to provide plural grooves, as gas communication grooves, on the front and rear main surfaces of the separator plate. In this connection, it is to be noted that bank-shaped portions between neighboring grooves on a same main surface thereof is referred to as ribs. One cell, namely unit cell, is structured by a pair of such separator plates and by an MEA sandwiched therebetween.

In order to supply gas communication grooves on one main surface out of the front and the rear main surfaces of a separator plate with a fuel gas and exhaust e.g. excessive gas therefrom, and to supply gas communication grooves on the other main surface thereof with an oxidant gas and similarly exhaust e.g. excessive gas therefrom, it is a general method to provide the separator plate with two through-holes and to respectively connect the inlet and outlet of the gas communication grooves with these through-holes, whereby each reactive gas is directly supplied, by being furcated, to each gas communication groove from one of the through-holes, while each reactive gas is exhausted from the other through-hole. The through-holes for supplying each reactive gas to each gas communication groove and for exhausting e.g. excessive gas from each gas communication groove are referred to as manifold openings. Such gas supply/exhaustion method is referred to as inner manifold system.

Other than the inner manifold system, there is another method, which is referred to as outer manifold system. The outer manifold system is such system that a pipe arrangement for supplying each reactive gas is furcated to the number of the separator plates to be used, and that each furcated portion is directly connected into each groove of the separator plate by using a piping jig which is referred to as manifold.

Further, the fuel cell is usually cooled by a cooling medium, because the cell generates heat during its operation. Usually, a cooling member for flowing a cooling medium is provided for every 1 to 3 cells. In this regards, it is an often employed way to assemble two separator plates each having, on one main surface thereof, gas communication grooves for a reactive gas and having, one the other main surface thereof, a flow channel for a cooling medium in a manner that the both other main surfaces, i.e. both surfaces each having the flow channel for the cooling medium, are contacted with each other to form a cooling member.

These MEAs, separator plates and, depending on needs, cooling members are alternately stacked to assemble a stack of 10 to 200 cells. Such stacked body is referred to as cell stack. The cell stack is sandwiched by end plates, with current collecting plates and insulating plates being present therebetween, and the cell stack is fixed by tightening both end plates, using tightening bolts, with a pressure being thereby applied to the cell stack, whereby a fuel cell having structure of a general cell stack system is formed.

It has been a common sense in such fuel cell according to prior art (for example, Japanese Laid-open Patent Publication 2000-133291) to form gas communication grooves, hence ribs, on one main surface out of a front main surface and a rear main surface of each separator plate are formed to be positioned in correspondence with gas flow channel (sic gas communication grooves), hence ribs, on the other main surface. And it has been a common sense to stack separators in such a manner that ribs, hence gas communication grooves, of all separator plates in a cell stack simply align with each other from one end to the other end of the cell stack, and that a tightening force for fixing the cell stack is transferred through the ribs.

However, in the case of such a fuel cell of prior art, bottom portions of the communication grooves between both gas communication grooves on both front and rear main surfaces of each separator plate are thinnest wall portions in the separator plate. Consequently, it has been very likely that cracks or fractures are generated at the groove bottom portions, resulting in gas leakage at such portions, by the pressure of the tightening bolts in the manufacturing of the cell stack or by pressure applied to the fuel cell during use of the fuel cell after the manufacturing. Conversely describing, under a strong requirement for thinner fuel cells in recent years, the conventional method of simply stacking separator plates having thinnest wall portions at the groove bottom portions of each of the separator plates has had a limitation of thinning the fuel cells because of the limitation of strength of the groove bottom portions.

Further, when separator plates are manufactured by compression molding or injection molding using a mold for the purpose of lowering cost, it is difficult for a material for separators to flow into portions of the mold corresponding to the above described thin wall portions of separator plates. Thus, there has also been a problem of difficulty of manufacturing.

DISCLOSURE OF INVENTION

An object of the present invention is to increase the mechanical strength of electrically conductive separator plates by improving them, thereby to suppress occurrence of gas leakage.

A polymer electrolyte fuel cell according to the present invention comprises a cell stack including plural electrically conductive separator plates and MEAs inserted among the electrically conductive separator plates, wherein each of the MEAs comprises a hydrogen ion conductive polymer electrolyte membrane together with an anode and a cathode to sandwich the hydrogen ion conductive polymer electrolyte membrane, wherein each of the electrically conductive separator plates comprises plural striated gas communication grooves on one main surface thereof for supplying and exhausting a fuel gas to and from the anode, and plural striated gas communication grooves on the other main surface thereof for supplying and exhausting an oxidant gas to and from the cathode, and wherein the gas communication grooves on one of the main surfaces out of both of the gas communication grooves of the each of the electrically conductive separator plates are arranged to correspond to ribs among the gas communication grooves on the other of the main surfaces.

The gas communication grooves for supplying and exhausting the fuel gas to and from the anode of the each of the MEAs are preferred to be positioned to correspond to the gas communication grooves for supplying and exhausting the oxidant gas to and from the cathode of the same each of the MEAs. In the case of this groove-MEA-groove correspondence, it is preferred that substantially all the electrically conductive separator plates have a same shape, and that neighboring ones of the electrically conductive separator plates are arranged to be alternately rotated 180 degrees on the main surfaces of the electrically conductive separator plates.

From the viewpoint of maintaining easiness of manufacturing cell stacks, the gas communication grooves for supplying and exhausting the fuel gas to and from the anode of the each of the MEAs are preferred to be positioned to correspond to ribs among the gas communication grooves for supplying and exhausting the oxidant gas to and from the cathode of the same each of the MEAs. In the case of this groove-MEA-rib correspondence, it is preferred that substantially all the electrically conductive separator plates have a same shape, and that neighboring ones of the electrically conductive separator plates are arranged to be directed to a same direction on the main surfaces of the electrically conductive separator plates. Further, with respect to the each of the electrically conductive separator plates in the case of this groove-MEA-rib correspondence, a width of each of the ribs among the gas communication grooves on the one main surface and a width of each of the ribs on the other main surface are preferred to be respectively greater than but not greater than 1.4 times a width of each of the gas communication grooves on the one main surface and a width of each of the gas communication grooves on the other main surface. Furthermore, with respect to the each of the electrically conductive separator plates in the case of this groove-MEA-rib correspondence, widths of bottom plane of the both of the gas communication grooves of each of the electrically conductive separator plates are preferred to be smaller than but not smaller than 0.6 times widths of surface planes of the both gas communication grooves.

Still further, among the plural electrically conductive separator plates, those electrically conductive separator plates placed at both ends of the cell stack are preferred to have mechanical strengths higher than those of the other electrically conductive plates. In this case, it is preferable from the viewpoint of easy way of increasing the mechanical strength that the those electrically conductive separator plates placed at the both ends of the cell stack among the plural electrically conductive separator plates are made to have thicknesses larger than those of the other electrically conductive separator plates, or that reinforcing members having a carbon material or a metal material as a constituting element thereof are added to the those electrically conductive separator plates placed at the both ends.

According to the polymer electrolyte fuel cell of the present invention, the comparative thickness of the thinnest wall portion within the electrically conductive separator plate is made thicker than the comparative thickness thereof in the case of an electrically conductive separator plate of prior art. Thereby, conventionally recognized problems of cracks and fractures at the thinnest wall portions are suppressed, and the thinnest wall portions can be more easily manufactured. Consequently, the fuel cell of a smaller size can be made at a lower cost, with the mechanical strength thereof being kept or even increased.

BEST MODE FOR CARRYING OUT THE INVENTION

As described above, the feature of the present invention is in that gas communication grooves on one main surface of each electrically conductive separator plate out of the front and the rear main surfaces thereof are arranged to correspond to ribs among gas communication grooves on the other main surface thereof. Thereby, even if the thickness of the electrically conductive separator plate of prior art (sic: even if the thickness of the electrically conductive separator plate) is the same as the thickness of the electrically conductive separator plate of prior art, necessary depth of each gas communication groove can be secured without overly thinning the thinnest wall portion within the electrically conductive separator plate. As a result, gas leakage caused by cracks or fractures at the thinnest wall portions can be suppressed.

Furthermore, the thinnest wall portions can be made to have a thickness to some extent. Thus, when a starting material for a separator plate, during above described compression molding o injection molding, is to be flown into a thin wall portion, then worsening of the flow-in thereof can be prevented. That is, according to the present invention, the electrically conductive separator plate can be made to have a smaller thickness, with necessary thickness of the thinnest wall portions of the electrically conductive separator plate being secured, whereby a small-sized and easy-to-manufacture fuel cell can be provided.

When a plurality of such electrically conductive separator plates are prepared, and a cell stack is made by sandwiching MEAs each between neighboring electrically conductive separator plates, it is preferable that the gas communication grooves for supplying and exhausting a fuel gas to and from the anode of each MEA are positioned in correspondence with the gas communication grooves for supplying and exhausting an oxidant gas to and from the cathode of the same MEA, namely that groove-MEA-groove correspondence is made. Since also both ribs with the MEA therebetween can be positioned in correspondence with each other, the tightening pressure applied to the cell stack can be easily counteracted thereby. Further, the efficiency of reaction between both gases can be maintained high.

In order to realize such cell stack structure, a plurality of electrically conductive separator plates respectively having two kinds of shapes are to be made for use as neighboring electrically conductive separator plates, and are then to be stacked one by one. Furthermore, from the viewpoint of easiness of manufacturing and low cost of a cell stack, it is a preferable method for realizing the groove-MEA-groove correspondence that a plurality of electrically conductive separator plates of a single kind are to be prepared for substantially all the electrically conductive separator plates in the cell stack, except for those for both ends of the cell stack and for those for cooling members, and that neighboring electrically conductive separator plates are arranged to be alternately rotated 180 degrees with respect to each other on the main surface of each electrically conductive separator plate.

For such purpose, each electrically conductive separator plate needs to be designed to have an appropriate pattern of the gas communication grooves on each one of the front and the rear main surfaces thereof. An example of such design is shown in Embodiment Mode 1 later. Further, it is preferable in such groove-MEA-groove correspondence that the bottom plane of the groove of each of both gas communication grooves is smaller than the width of the surface plane of the groove thereof. This is because the manufacturing process of separator plates by e.g. compression molding and injection molding has an advantage of better mold releasing, since thereby groove walls or rib walls have such structure to get closer to each other toward inside of each separator plate.

Similarly, when plural electrically conductive separator plates are prepared to sandwich MEAs among neighboring ones of the electrically conductive separator plates thereby to make a cell stack, the gas communication grooves for supplying and exhausting the fuel gas to and from each MEA can be positioned to correspond to the ribs among the gas communication grooves for supplying and exhausting the oxidant gas to and from the same MEA, namely groove-MEA-rib correspondence. Thereby, plural electrically conductive separator plates of only one kind of shape need be prepared for substantially all the electrically conductive separator plates, and neighboring electrically conductive separator plates can be arranged to be directed to the same direction with respect to the main surface of each electrically conductive separator plate. Accordingly, easiness of manufacturing of cell stacks can be maintained at a high level.

In the case of such groove-MEA-rib correspondence, it is preferable with respect to two electrically conductive separator plates sandwiching each MEA therebetween that both end portions of the width of each rib of one of the separator plates are related to partially overlap the end portions of the widths of the two corresponding ribs of the other separator plate. This is because the tightening pressure for making a fuel cell by tightening the cell stack at both ends thereof can be transferred by the group of the ribs, whereby the tightening pressure can be counteracted by the group of the ribs. For these reasons, the width of each rib between the gas communication grooves on one main surface of the front and the rear main surfaces of each electrically conductive separator plate, and the width of each rib on the other main surface thereof are preferred to be larger than the width of each gas communication groove on the one main surface and the width of each gas communication groove on the other main surface, respectively. However, if the ratio of the rib width to the groove width becomes higher than 1.4, diffusion of reactive gases to MEAs gets deteriorated to lower resultantly obtained cell voltages because of more MEA portions being pressed by the ribs, so that the ratio is preferred to be not higher than 1.4.

Likewise, in the case of this groove-MEA-rib correspondence, the width of the bottom plane of each of both gas communication grooves is preferred to be smaller than the width of the surface plane thereof. This is because crack generation in the electrically conductive separator plates is better suppressed thereby when a tightening pressure is applied to the cell stack. However, if the ratio of the bottom plane width to the surface plane width in such groove becomes lower than 0.6, the suppression of crack generation is not improved any further, and gas pressure loss increases because of an increase of cross-sectional area of each gas communication groove. In other words, effective gas utilization is impaired thereby, so that the ratio of the bottom plane width to the surface plane width of the groove is preferred to be not lower than 0.6.

It is to be noted that in the above description and the following Embodiment Modes and the Examples, examples of groove-MEA-groove correspondence and examples of groove-MEA-rib correspondence are described as representative examples for embodying the present invention. However, as far as the feature of the present invention is performed, which is to position the grooves on one main surface of the front and the rear main surfaces of each separator plate in correspondence with the ribs of the other main surface thereof, the relation between neighboring electrically conductive separator plates to sandwich an MEA therebetween does not need to be limited to the cases of such representative examples. For example, according to the present invention, the grooves on an electrically conductive separator plate facing one electrode side of an MEA can be positioned to correspond to side walls of the grooves or the ribs of the grooves on an electrically conductive separator plate facing the other electrode side of the same MEA. In other words, such correspondence relation as of groove-MEA-groove/rib midpoint can be used. Putting it still another way, in the arrangement of two electrically conductive separator plates sandwiching an MEA therebetween, relative position of the grooves/ribs on one of the separator plates facing the MEA with respect to the grooves/ribs on the other separator plate can be of a shifted position, depending on needs.

It is preferred, from the viewpoint of further increasing the strength of the cell stack, that among the electrically conductive separator plates, the electrically conductive separator plates placed at both ends of the cell stack have higher mechanical strength than those of the other electrically conductive separator plates, i.e. those at a middle portion of the cell stack. Thereby, such problem as forth below is solved. The problem is that, when tightening pressure is not uniformly distributed in tightening the cell stack by e.g. tightening rods, the electrically separator plates at both ends of the cell stack are likely to have insufficient mechanical strength at portions thereof to bear concentrated load, whereby the separator plates per se at both ends thereof get fractured, resulting in occurrence of leakage of e.g. gases. In such case, it is a preferable method, for easily increasing the mechanical strength of the electrically conductive separator plates at both ends thereof, to making thicker the electrically conductive separator plates at both ends thereof than the other electrically conductive separator plates, or to add, to the electrically conductive separator plates, reinforcing members having a carbon material or a metal material as its constituting element.

Embodiment Mode 1

Figure 1:
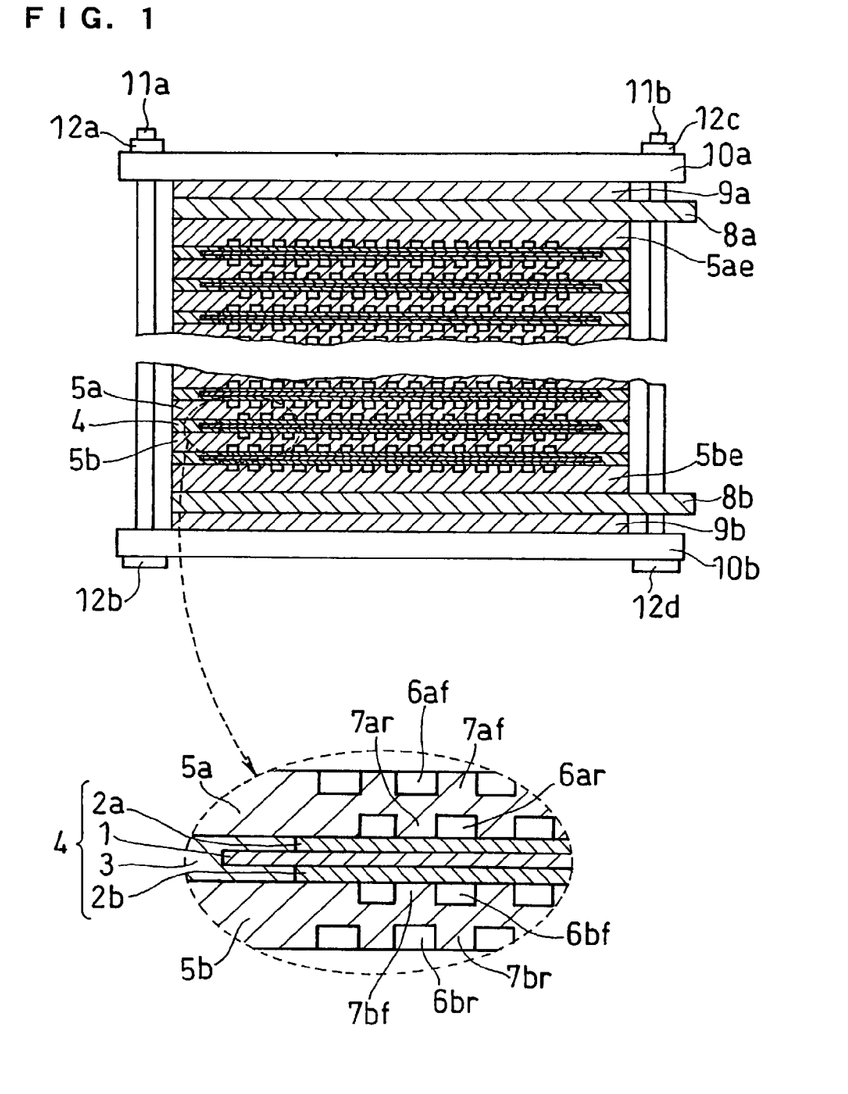
FIG. 1 is a schematic cross-sectional view, including a partially enlarged view, of a fuel cell according to Embodiment Mode 1 of the present invention, showing a main stack structure thereof.

A main stack structure of a polymer electrolyte fuel cell made according to the present Embodiment Mode 1 is shown in FIG. 1. In FIG. 1, a middle portion of the stack structure is partially omitted, but the omitted portion is similar to the shown portion. The structure of FIG. 1 is described below, mainly focusing the constituting elements having reference numerals. Constituting elements not having reference numerals are similar to those having ones, if they are shown in a shape similar to each other. Further, FIG. 1 is a schematic drawing, wherein dimensions of respective constituting elements are not necessarily precise. This applies to other schematic drawings.

Firstly, a main part of this fuel cell is a cell stack, which is a portion in FIG. 1 between electrically conductive separator plates $5ae$ and $5be$ at both ends thereof, and which has, as main constituting elements, plural electrically conductive separator plates and MEAs (electrolyte membrane-electrode assemblies) sandwiched by neighboring electrically conductive separator plates. As denoted by reference numerals in the partially enlarged view, reference numeral 1 is a polymer electrolyte membrane for selectively transporting hydrogen ions. On both main surfaces of this polymer electrolyte membrane 1, a pair of electrodes $2a$, $2b$ are formed. One of the pair of electrodes is anode, and the other is cathode. Each electrode is structured by a catalyst layer having, as a main component, carbon powder carrying a platinum metal catalyst and by a gas diffusion layer formed on an outer surface of this catalyst layer and having both gas permeability and electronic conductivity.

At the peripheries of the electrodes $2a$, $2b$, gas sealing members and gaskets are placed in order to prevent a fuel gas and an oxidant gas, to be supplied by a later described method, from leaking to outside and from mixing with each other. In FIG. 1, these elements are shown as a gasket 3 to represent them. These gas sealing members and the gaskets 3 are preliminarily and integrally assembled with the electrodes $2a$, $2b$ and the polymer electrolyte membrane 1. The thus integrally assembled structure is one MEA 4. On the front and the rear main surfaces of the MEA 4, electrically conductive separator plates $5a$, $5b$ are placed in order to mechanically fix the MEA and to electrically connect neighboring MEAs in series with each other. The combination of the electrically conductive separator plates $5a$, $5b$ and the MEA 4 constitutes one cell, i.e. unit cell.

On the main surface of the respective electrically conductive separator plates $5a$, $5b$ to contact the MEA 4, plural striated gas communication grooves $6ar$, $6bf$, which supply reactive gases, i.e. the fuel gas and the oxidant gas, and exhaust generated gas and excessive gas to and from the corresponding electrodes $2a$, $2b$, are formed to face each other. Further, on the other main surfaces of the electrically conductive separator plates $5a$, $5b$, gas communication grooves $6af$, $6br$ are formed for respectively supplying and exhausting reactive gases to and from subsequently neighboring MEAs. Here, the word "striated" means that the grooves extend vertically to the paper plane at the cross-sectional portion of FIG. 1. It is not limited to the case where they simply extend in parallel, but can include the case where they extend in parallel, meandering in a so-called serpentine shape such as the one later described with reference to FIG. 2. There are ribs $7af$ to exist among and to define neighboring gas communication grooves $6af$. Likewise, there are ribs $7ar$, $7bf$, $7br$ to exist among and to define neighboring gas communication grooves $6ar$, $6bf$, $6br$. Accordingly, the ribs $7af$, $7ar$, $7bf$, $7br$ are also striated and extend in parallel like the gas communication grooves $6af$, $6ar$, $6bf$, $6br$. It is to be noted that the arrangement is made for the fuel gas to be supplied to the anode among the electrodes $2a$, $2b$ and for the oxidant gas to be supplied to the cathode thereof.

A feature of the present invention is in that the gas communication grooves on the front and the rear main surfaces of each electrically conductive separator plate are not positioned to correspond to each other, e.g. that the gas communication groove $6af$ and the gas communication groove $6ar$, are not positioned to correspond to each other, but are positioned to correspond to the ribs $7ar$, $7af$, respectively. Describing this in more detail, referring to the electrically conductive separator plate $5a$, for example, in FIG. 1, the gas communication groove $6ar$ and the rib $7af$ are vertically aligned with each other on the paper plane thereof, while the gas communication groove $6af$ and the rib $7ar$ are aligned with each other on the paper plane thereof. It is to be noted here that as shown in FIG. 1, the uppermost electrically conductive separator plate $5ae$ has gas communication grooves formed on only the lower main surface thereof, whereas the lowermost electrically conductive separator plate 5be has gas communication grooves formed on only the upper main surface thereof.

It is a further feature of the present Embodiment Mode 1 that with respect to the electrically conductive separator plates 5a, 5b to sandwich the MEA 4 therebetween, the communication grooves 6ar, 6bf respectively formed on the main surfaces of the electrically conductive separator plates to respectively face the MEA 4 are positioned to correspond to each other, and that the ribs 7ar, 7bf respectively formed thereon are positioned to correspond to each other. Because of this feature, the ribs correspond to each other with the MEA 4 being sandwiched therebetween. Therefore, the group of ribs can easily bear a tightening pressure to be applied to a resultant cell stack, and the reaction of the reactive gases by way of the MEA 4 can be easily maintained at a high level.

As will be described with reference to FIG. 2, each electrically conductive separator plate has e.g. manifold openings formed therein for supplying and exhausting the fuel gas and the oxidant gas through the gas communication grooves on the front and the rear main surfaces thereof, with respect to all the electrically conductive separator plates in the cell stack as shown in FIG. 1. Further, for every 1 to 3 unit cells, a cooling member is provided, which comprises an electrically conductive separator plate having a cooling medium flow channel on a rear surface thereof. These MEAs, separator plates and, depending on needs, cooling members are alternately stacked to structure the cell stack of FIG. 1. This cell stack is sandwiched by end plates 10a, 10b with current collecting plates 8a, 8b and insulating plates 9a, 9b being inserted therebetween, and both end plates are tightened by tightening rods 11a, 11b and tightening bolts 12a, 12b, 12c, 12d to apply a pressure to the cell stack, thereby to fix the assembly. The thus made assembly us the fuel cell according to the present Embodiment Mode 1.

Figure 2A:
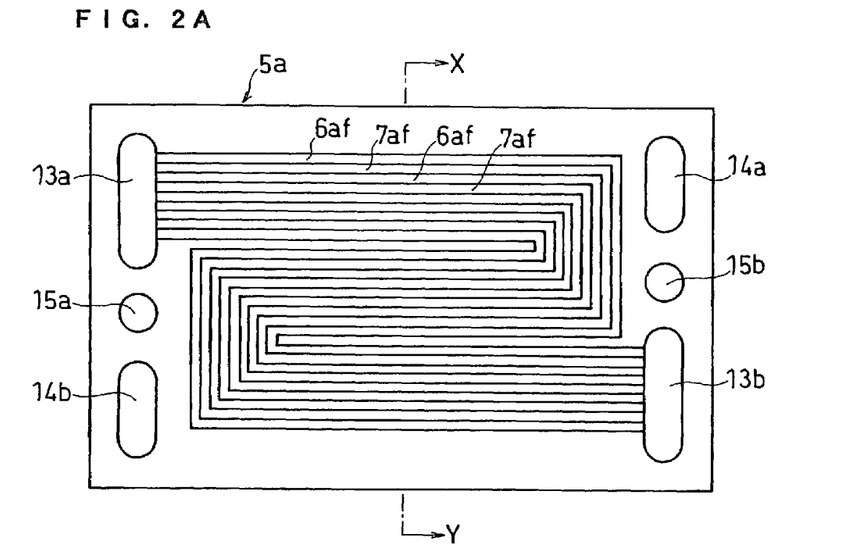
FIG. 2A is a plan view of a cathode side main surface of an electrically conductive separator plate used for the fuel cell according to Embodiment Mode 1.
Figure 2B:
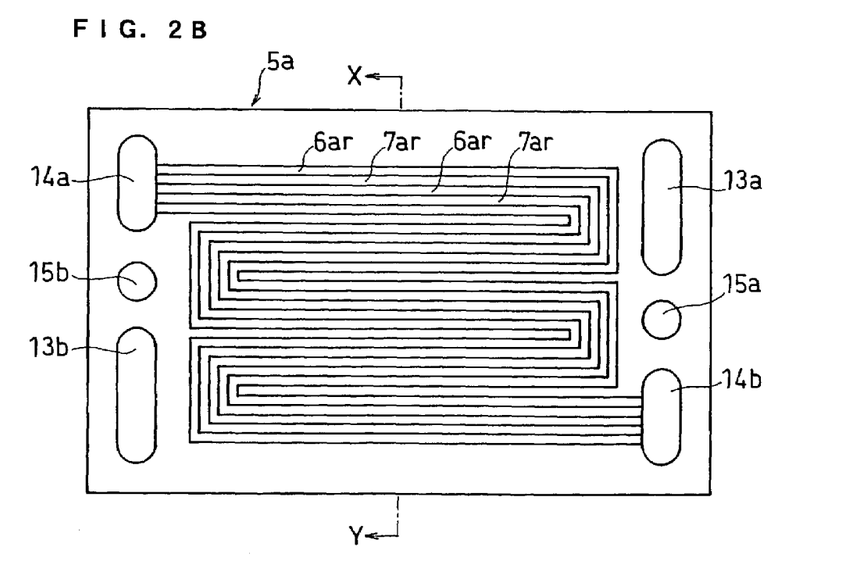
FIG. 2B is plan view of an anode side main surface of the same electrically conductive separator plate.

FIG. 2A is a front view of a cathode side main surface of an electrically conductive separator plate, e.g. 5a, used for the fuel cell according to the Embodiment Mode 1. FIG. 2B is a front view of an anode side main surface of the same electrically conductive separator plate, and is a rear view of FIG. 2A. In FIG. 2A, reference numerals 6af and 7af are respectively oxidant gas communication grooves and ribs thereamong. In FIG. 2B, reference numerals 6ar and 7ar are respectively fuel gas communication grooves and ribs thereamong. Further, in common with FIG. 2A and FIG. 2B, reference numeral 13a is a manifold opening for supplying the oxidant gas, and 13b is a manifold opening for exhausting the same. Reference numeral 14a is a manifold opening for supplying the fuel gas, and reference numeral 14b is a manifold opening for exhausting the same. Reference numeral 15a is a manifold opening for supplying the cooling medium, and reference numeral 15b is a manifold opening for exhausting the same. The pattern of grooves and ribs as shown here are of so-called serpentine shape, but are not necessarily of such serpentine shape as far as features of the present invention are performed thereby.

Furthermore, the cooling member, described here as an example, is of inner manifold system, but and outer manifold system can also be employed therefor in order to perform the features of the present invention.

As described with reference to FIG. 1, the gas communication grooves on the front and the rear side of the electrically separator plate as shown in FIG. 2A, 2B, when seen in a direction perpendicular to the paper plane, are positioned to be shifted by one pitch, i.e. by the amount of the width of one communication groove. Consequently, the groove 6af at the cathode side is basically positioned to correspond to the rib 7ar of the anode side. When these electrically conductive separator plates are stacked in a manner that neighboring electrically conductive separator plates are arranged to be alternately rotated 180 degrees, with the electrically conductive separator plates staying on the respective main surfaces thereof, the gas communication grooves facing each other with the MEA therebetween are positioned to correspond to each other. This brings about a consequence that every other electrically conductive separator plate is arranged to be directed to the same direction. Explaining this 180-degree rotation arrangement with reference to the rectangular front view of the electrically conductive separator plate 5a of FIG. 2A, it is such arrangement that the rectangle is rotated 180 degrees around a rotational axis which is a line being perpendicular to the paper plane and passing through the center of the rectangle. That is, such structure is preferable because it is only necessary to prepare electrically conductive separator plates of a single kind and same shape. It is to be noted here that the cross-sectional view of FIG. 1 corresponds to the cross-section, cut by the X-Y plane, of above described stack of the electrically conductive separator plates of FIG. 2A and FIG. 2B.

When a structure of such groove-MEA-groove correspondence is to be realized, the manner of alternate 180-degree rotational arrangement as described above can be adopted by designing the patterns of grooves and ribs as shown in FIG. 2A and FIG. 2B. However, otherwise, two kinds of electrically conductive separator plates to allow the groove-MEA-groove correspondence can be prepared and stacked successively.

As described above, a first feature of the present invention is that the gas communication grooves on one main surface out of the front and the rear main surfaces of each electrically conductive separator plate are positioned to correspond to the ribs among the gas communication grooves on the other main surface thereof. Such point is described with reference to FIG. 3, FIG. 4 and FIG. 5.

Figure 3:
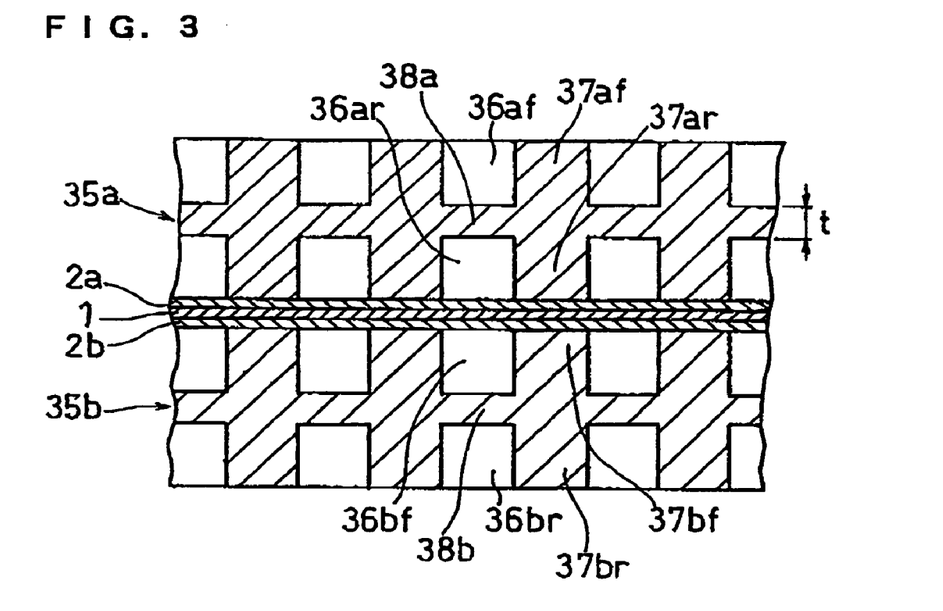
FIG. 3 is a schematic cross-sectional view, showing a part of a stack structure of two electrically conductive separator plates of prior art with an MEA sandwiched therebetween.
Figure 4:
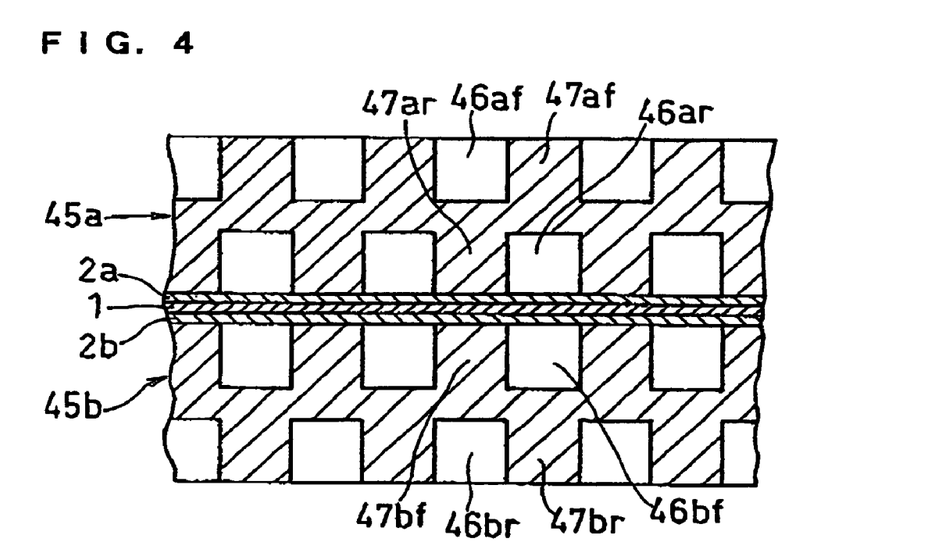
FIG. 4 is a schematic cross-sectional view, showing a part of a stack structure of two electrically conductive separator plates used for the fuel cell according to Embodiment Mode 1 of the present invention with an MEA sandwiched therebetween.
Figure 5:
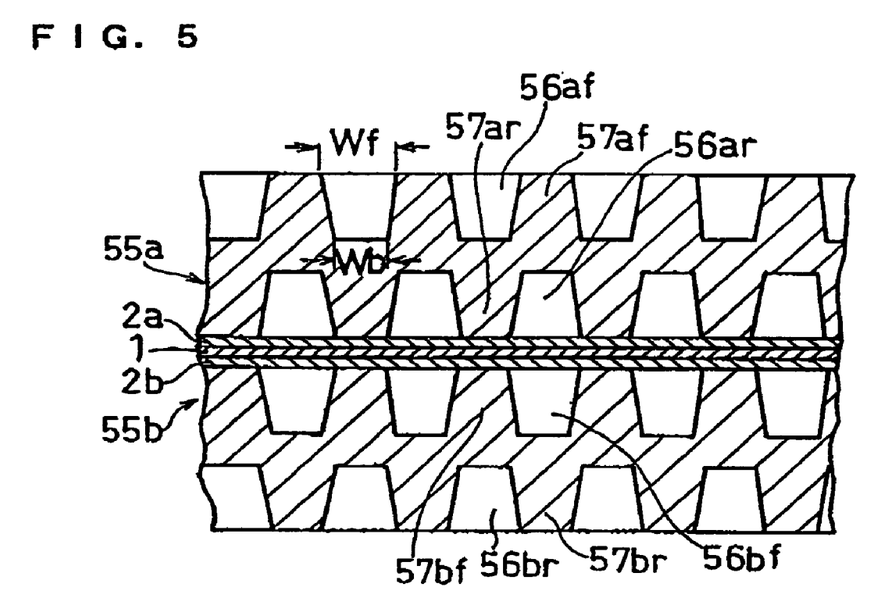
FIG. 5 is a schematic cross-sectional view, showing a part of a stack structure of another mode of two electrically conductive separator plates usable for the fuel cell according to Embodiment Mode 1 of the present invention with an MEA sandwiched therebetween.

Referring to FIG. 3, FIG. 4 and FIG. 5, reference numerals 1, 2a and 2b are a polymer electrolyte membrane and a pair of electrodes, respectively, which are main constituting elements of an MEA.

FIG. 3 is a schematic cross-sectional view, showing a part of s stack structure of two electrically conductive separator plates of prior art with an MEA being sandwiched therebetween, and is a drawing for reference. Reference numerals 35a and 35b are electrically conductive separator plates of prior art, respectively. In the respective electrically conductive separator plates 35a and 35b, all ribs 37af, 37ar, 37bf, 37br vertically correspond, i.e. are aligned. But similarly, gas communication grooves 36af, 36ar are positioned to correspond to each other, and gas communication grooves 36bf, 36br are also positioned to correspond to each other. Consequently, the thickness t of groove bottom portions 38a, 38b, which are thinnest wall portions, is caused to be small. At such portions, fractures and cracks are likely to be generated, because of their thinness, by e.g. tightening pressure to the cell stack as described above, so that gas leakage has been likely to be generated. For this reason, furthermore, it has been difficult to make thin the electrically conductive separator plates 35a, 35b.

FIG. 4 is a schematic cross-sectional view, drawn for the purpose of easier comparison with FIG. 3, showing a part of a structure corresponding to the stack structure of the two electrically conductive separator plates with the MEA being sandwiched therebetween according to the present Embodiment Mode 1 of FIG. 1. In electrically conductive separator plates 45a, 45b, gas communication grooves 46af correspond to ribs 47ar, and similar correspondences being between 47af and 46ar, between 47bf and 46br, and between 46bf and 47br. Accordingly, therein, such thin wall portions having a thickness t as of 38a and 38b in FIG. 3 do not exist. The thin wall portions thereof are designed to be thicker than those of prior art. Therefore, the electrically conductive separator plates can be made to have a further smaller thickness, and can be easily manufactured by compression molding or injection molding.

FIG. 5 shows a modified structure, in which the cross-sectional shape of each gas communication groove of the electrically conductive separator plates of FIG. 4 have been so changed that width Wb of bottom plane of each groove is designed to be smaller than width Wf of surface plane of each groove. In electrically conductive separator plates 55a, 55b, gas communication grooves 56af correspond to ribs 57ar, and similar correspondences being between 57af and 56ar, between 57bf and 56br, and between 56bf and 57br. Accordingly, therein, such thin wall portions having a thickness t as of 38a and 38b in FIG. 3 do not exist. The thin wall portions thereof are designed to be thicker than those of prior art. Furthermore, in the case of the structure of FIG. 5, the width of the groove bottom portion is designed to be smaller, so that further easier manufacturing of electrically conductive separator plates can be realized owing to further better mold releasing, when the separator plates are manufactured by compression molding or injection molding. Furthermore, it has such feature as well that since it is a structure having a higher strength against tightening pressure in manufacturing the cell stack and against pressure applied to the fuel cell during use of the fuel cell, the electrically conductive separator plates can be easily made to have a further smaller thickness.

Like this, the shapes of the striated gas communication grooves and the ribs can be freely designed as far as they have the features of the present invention. As in FIG. 4, the widths and depths or heights of the corresponding grooves and ribs can be substantially equivalent. Or as in FIG. 5, they can be changed. Further, in another way, the structure can be made to have a higher strength by increasing the widths of the ribs.

Another feature of the present Embodiment Mode 1 regarding the purpose of reinforcing the electrically conductive separator plates is in the reinforcement of the electrically conductive separator plates at both ends of the cell stack. That is, the problem is in fractures of the electrically conductive separator plates at both ends of the cell stack caused by non-uniform pressure distribution therein, when the cell stack is tightened by e.g. tightening rods as described above. For this purpose, the electrically conductive separator plates 4ea, 4eb are designed to have a larger thickness than that of the other electrically conductive separator plates, as shown in FIG. 1. As a method of increasing the thickness of the thickness thereof, two or more electrically conductive separator plates can be stacked there.

Figure 6:
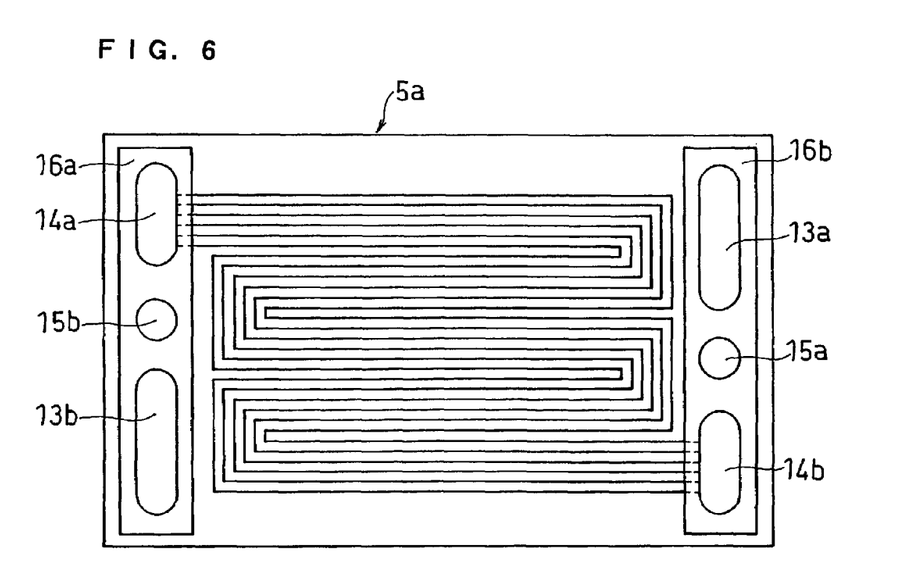
FIG. 6 is a plan view of a main surface at the cell stack side of an electrically conductive separator plate for both ends of the cell stack, which can be used for fuel cells according to Embodiment Modes 1 and 2 of the present invention.

FIG. 6 is a plan view of an example of one main surface, at the cell stack side, of each electrically conductive separator plate to be used for both ends of the cell stack, and shows another countermeasure for solving the above described problem as to the electrically conductive separator plates at both ends thereof. FIG. 6 shows a countermeasure in the case that one electrically conductive separator plate, e.g. 5a, at one of the both ends has anode side gas communication grooves, as shown in FIG. 2B, on one main surface thereof. Reference numerals 13a, 14a, 15a are manifold openings for supplying the oxidant gas, the fuel gas and the cooling medium, respectively, while reference numerals 13b, 14b, 15b are manifold openings for exhausting the oxidant gas, the fuel gas and the cooling medium, respectively. Reference numerals 16a, 16b are reinforcing members having, as a constituting element thereof, e.g. a carbon material or a metal material. As shown therein, these reinforcing members 16a, 16b are attached to peripheries of the manifold openings 14a, 15b, 13b, 13a, 15a, 14b, and have through-holes corresponding to those 6 manifolds. Owing to such structure, the cell performance can be maintained, and damages, such as cracks, of the electrically conductive separator plate 5a can be suppressed.

Embodiment Mode 2

A feature of the present invention is basically in that, like the relation between 46af and 17ar in FIG. 4, gas communication grooves on one main surface out of the front and the rear main surfaces of each electrically conductive separator plate are positioned basically to correspond to ribs on the other main surface thereof. In the Embodiment Mode 1 furthermore, gas communication grooves of neighboring electrically conductive separator plates with an MEA sandwiched therebetween, e.g. 46ar and 46bf in FIG. 4, correspond to each other. However, the relation of correspondence between grooves and ribs of neighboring electrically conductive separator plates with an MEA sandwiched therebetween can be varied as far as it has the feature of the present invention. This is described below as the present Embodiment Mode 2.

Figure 7:
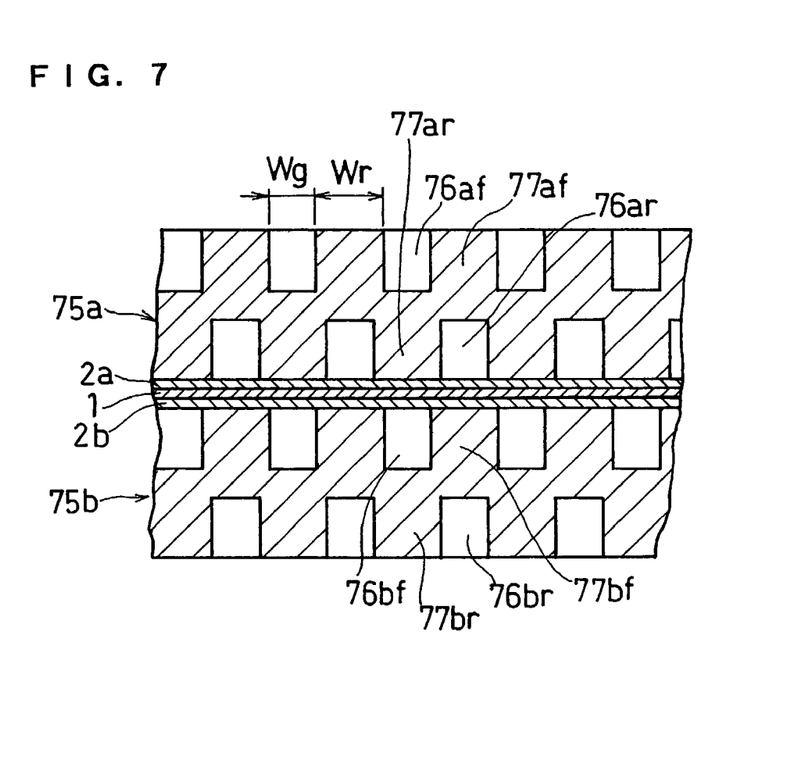
FIG. 7 is a schematic cross-sectional view, showing a part of a stack structure of two electrically conductive separator plates used for the fuel cell according to Embodiment Mode 2 of the present invention with an MEA sandwiched therebetween.

FIG. 7 is a schematic cross-sectional view showing a part of a stack structure of two electrically conductive separator plates, as used for the fuel cell of Embodiment Mode 2 of the present invention, with an MEA being sandwiched therebetween. That is a structure in which an MEA is sandwiched by a pair of electrically conductive separator plates 75a, 75b. The electrically conductive separator plate 75a has gas communication grooves 76af, 76ar and ribs 77af, 77ar, while the electrically conductive separator plate 75b has gas communication grooves 76bf, 76br and ribs 77bf, 77br. With reference to FIG. 7, e.g. 76ar corresponds to 77bf with the MEA therebetween. In other words, with respect to neighboring electrically conductive separator plates with an MEA therebetween, gas communication grooves of one of them correspond to ribs of the other of them. In this structure as well, the two kinds of reactive gases sufficiently react via the MEA.

This structure has a feature, like the case of FIG. 5, that thin wall portions of each electrically conductive separator plate, as in the structure of prior art, can be avoided, and that it can be easily manufactured. Further, this has another feature of easy manufacturing in that electrically conductive separator plates of a single kind with same shape can be prepared, and can be simply stacked in the same direction. It is to be noted that in FIG. 7 the width Wr of each rib is designed to be larger than the width Wg of each groove. The widths Wg and Wr can be the same, but it is preferable that Wr be larger than Wg. This is because thereby end portions of ribs of two electrically conductive separator plates to sandwich the MEA can be overlapped with respect to the positions thereof, and the tightening pressure for tightening the cell stack can be transferred to the ribs via the overlapped portions thereof, so that the tightening pressure can be better counteracted thereby. However, when Wr becomes larger than 1.4 times Wg, the gas diffusion of reactive gases to the MEA gets suppressed, so that Wr is preferred to be not larger than 1.4 times Wg.

Figure 8:
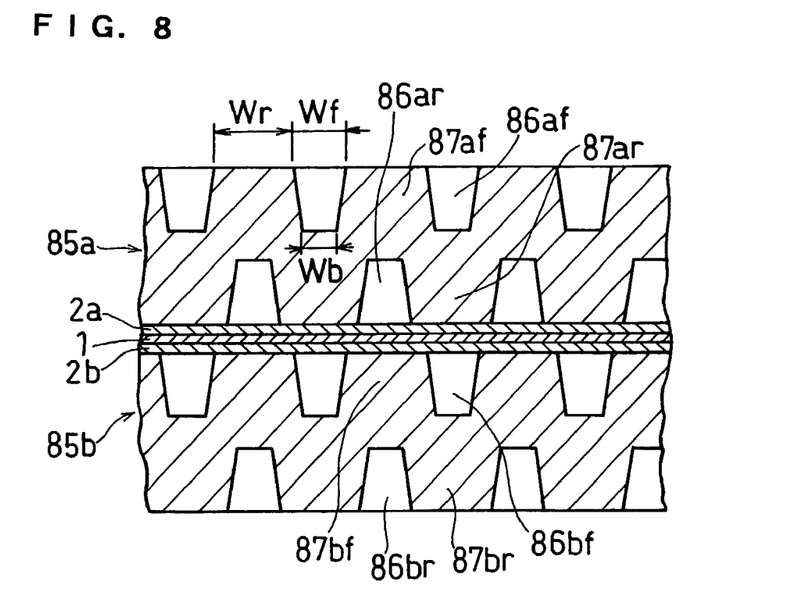
FIG. 8 is a schematic cross-sectional view, showing a part of a stack structure of another mode of two electrically conductive separator plates used for the fuel cell according to Embodiment Mode 2 of the present invention with an MEA sandwiched therebetween.

FIG. 8 is a schematic cross-sectional view showing a part of a stack structure using two electrically conductive separator plates, which can be used for the fuel cell of Embodiment Mode 2 of the present invention, and which have other shapes. That is a structure of a pair of electrically conductive separator plates 85a, 85b with an MEA sandwiched therebetween. The electrically conductive separator plate 85a has gas communication grooves 86af, 86ar and ribs 87af, 87ar, while the electrically conductive separator plate 85b has gas communication grooves 86bf, 86br and ribs 87bf, 87br. With reference to FIG. 8, e.g. 86ar corresponds to 87bf with the MEA sandwiched therebetween. That is, as in the case of FIG. 7, with respect to neighboring electrically conductive separator plates with an MEA sandwiched therebetween, gas communication grooves of one of the separator plates correspond to ribs of the other. In this structure as well, the two kinds of reactive gases sufficiently react via the MEA. Further, it becomes to possible to structure electrically conductive separator plates having low pressure loss, with the resistance thereof against gas leakage and the mechanical strength thereof being maintained.

This structure has, as in the case of FIG. 7, a feature of easy manufacturing in that electrically conductive separator plates of a single kind with same shape can be prepared, and can be simply stacked in the same direction. It is to be noted here that in FIG. 8 as well, the width Wr of each rib is designed to be larger than the width Wf of each groove. These Wf and Wr can be the same, but it is preferable that Wr be larger than Wf for the same reasons as set forth above with respect to the relation between Wg and Wr with reference to FIG. 7. That is because both end portions of the ribs of the two electrically conductive separator plates with the MEA sandwiched therebetween can be positioned to overlap. Further, for the same reason with respect to the relation between Wg and Wr, it is preferable that Wr be not larger than 1.4 times Wf.

Furthermore, it is preferable that the width Wb of the bottom plane of each gas communication groove be smaller than the width Wf of the surface plane of each gas communication groove. This is because thereby crack generation in each electrically conductive separator plate can be suppressed when a tightening pressure is applied to the cell stack. However, if Wb becomes smaller than 0.6 times Wf, the suppression of crack generation is not improved any further, and the cross-sectional area of each gas communication groove decreases, thereby to increase the gas pressure loss, namely to impair effective utilization of gases. Therefore, Wb is preferred to be not smaller than 0.6 times Wf.

Besides, in the present Embodiment Mode 2, the structure of the cell stack and the structure of the fuel cell, except for the relation among the grooves and ribs of the electrically conductive separator plates as described above, are the same as those described in Embodiment Mode 1 with reference to FIG. 1. For example, the reinforcing method for the electrically conductive separator plates at ends of the cell stack as shown in FIG. 6, just as it is, can be uses here. Accordingly, descriptions corresponding to those described in Embodiment Mode 1 with respect thereto are omitted here.

EXAMPLE 1

A polymer electrolyte fuel cell as described in Embodiment Mode 1 and shown in FIG. 1 was made by the following method.

Firstly, KETJEN BLACK EC (product of AKZO Chemie B.V., the Netherlands), which is of electrically conductive carbon particles having an average primary particle size of 30 nm, was used, and was allowed to carry 50 wt % of platinum particles having an average particle size of 30 Å, thereby to make a cathode side catalyst. Further, the same KETJEN BLACK as described above was allowed to carry 25 wt % of each of platinum particles and ruthenium particles each having an average particle size of 30 Å, thereby to make an anode side catalyst. These catalyst powders were dispersed in isopropanol. Meanwhile, a powder of perfluorocarbon sulfonic acid was dispersed in ethyl alcohol. The liquid dispersions of the catalysts were respectively mixed with the liquid dispersion of perfluorocarbon sulfonic acid, thereby to make pastes. Each of these pastes was coated by screen printing on each one surface of a carbon nonwoven fabric having a thickness of 250 µm, thereby to form a cathode catalyst layer and an anode catalyst layer, respectively. Adjustment was made so that each formed reactive electrode had an amount of 0.5 mg/cm$^2$ of the catalyst metal and an amount of 1.2 mg/cm$^2$ of perfluorocarbon sulfonic acid.

These anode side and cathode side electrodes were respectively bonded, by hot pressing, to both surfaces of a central portion of a proton conductive polymer electrolyte membrane having an area one size larger than that of each electrode in a manner for the printed catalyst layers to contact the electrolyte membrane. Here, a thin film made of perfluorocarbon sulfonic acid (product of DuPont Company, USA: NAFION 112) was used as the proton conductive polymer electrolyte (membrane). Further, at outer peripheries of the electrodes, gaskets made by blanking to have the same shape of the separator plates were bonded, by hot pressing, to both surfaces of the electrolyte membrane, which was thereby sandwiched by the gaskets, thereby to make an MEA. Here, each electrically conductive separator plate was made by machining an isotropic graphite material, and each gasket was made of a butyl rubber sheet.

A fuel cell according to the present Example 1 was made by using the thus made MEA as the MEA 4 in FIG. 1, and by using electrically conductive separator plates 5a, 5b, 5ae, 5be, current collecting plates 8a, 8b, insulating plates 9a, 9b, end plates 10a, 10b, tightening rods 11a, 11b, and tightening bolts 12a, 12b, 12c, 12d.

For comparison, a further fuel cell was made, which had the same structure as that of the present Example 1, except that the electrically conductive separator plates 5a, 5b were replaced by electrically conductive separator plates 35a, 35b of prior art having a structure as shown in FIG. 3.

Loads were imposed on these two fuel cells, and the loads were varied. Minimum loads under which cracks started to be generated in the electrically conductive separator plates are listed as crack generation load in Table 1.

TABLE 1

| Type of electrically conductive separator plate | Crack generation load |
|---|---|
| Prior art | 3.5 t |
| Example 1 | 5 t |

As understood from Table 1, the electrically conductive separator plates of the present Example 1 have very much improved strength against cracks.

EXAMPLE 2

According to the present Example 2, a fuel cell was made in the same manner as in Example 1, except that here only the shape of the electrically conductive separator plates was changed. According to the present Example 2, electrically conductive separator plates having a cross-sectional structure as shown in FIG. 7 were used.

In this case, electrically conductive separator plates having 6 different rib widths were prepared. Firstly, a fuel cell was made by using those having a certain rib width Wr1. Next, a fuel cell was made by using those having a rib width of Wr2. Subsequently, further fuel cells were similarly made by using those respectively having rib widths Wr3–Wr6, whereby 6 kinds of fuel cells in total were made.

Figure 9:
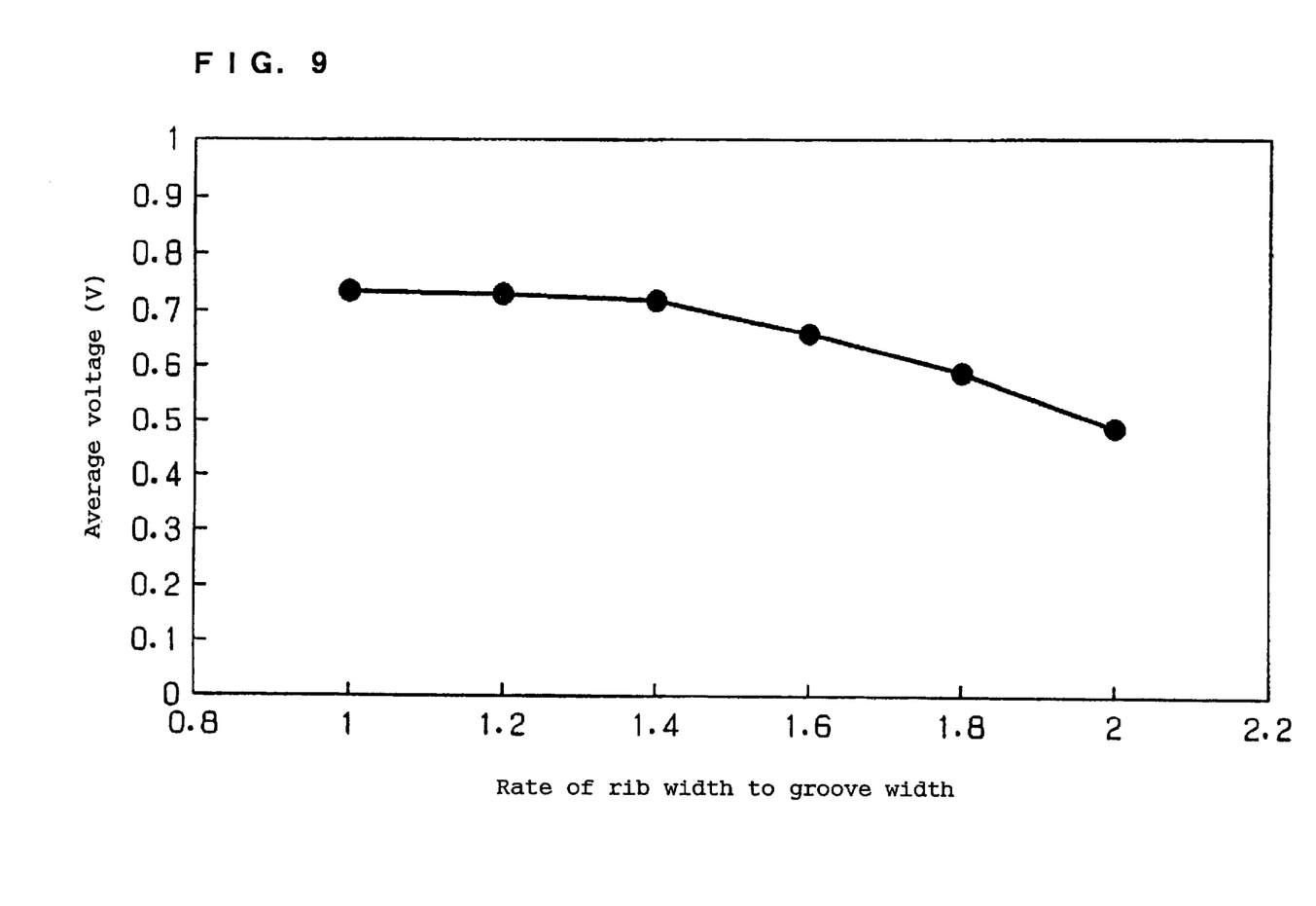
FIG. 9 is graph showing the relation between ratios of rib width/groove width and average voltage of 6 fuel cells made in Example 2.

These fuel cells were operated, and measured with respect to the cell voltages, the results of which are shown in FIG. 9. Here, the following conditions were set for the cell operation. That is, each fuel cell was kept at 85° C., and a hydrogen gas humidified and heated to have a dew point of 83° C. was supplied to one electrode side, while air humidified and heated to have a dew point of 78° C. was supplied to the other electrode side, with a fuel utilization rate being 80%, an oxygen utilization rate being 40%, and a current density being 0.3 A/cm$^2$ in the fuel cell.

In FIG. 9, the horizontal axis is ratio of rib width Wr to groove width Wg, indicating that as its value increases, the rib width increases. It is apparent from FIG. 9 that as the rib width increases, the cell voltage or cell performance tends to get lowered. This is considered to be because the diffusion of reactive gases to such portions of the MEA as being pressed by the ribs gets lowered. It is particularly evident that the curve starts remarkably falling where the Wr to Wg ratio exceeds 1.4. Accordingly, it is evident that the Wr to Wg ratio is preferably set to be not larger than 1.4.

EXAMPLE 3

According to the present Example 3, a fuel cell was made in the same manner as in Example 1, except that here only the shape of the electrically conductive separator plates was changed. According to the present Example 3, electrically conductive separator plates having a cross-sectional structure as shown in FIG. 8 were used.

In this case, electrically conductive separator plates having 4 different ratios of the width of groove bottom plane to the width of groove surface plane (Wb/Wf) were prepared. Firstly, a fuel cell was made by using those having a certain width ratio Wb1/Wf1. Next, a fuel cell was made by using those having a width ratio of Wb2/Wf2. Subsequently, further fuel cells were similarly made by using those respectively having width ratios Wb3/Wf3 and Wb4/Wf4, whereby 4 kinds of fuel cells in total were made.

Tightening loads were imposed on these 4 kinds of fuel cells, and the loads were then varied. Minimum loads under which cracks started to be generated in the electrically conductive separator plates are listed as crack generation load in Table 2.

TABLE 2

| Width of groove bottom plane/ width of groove surface plane | Crack generation load |
| --- | --- |
| 1 | 5 t |
| 0.8 | 5.2 t |
| 0.6 | 5.5 t |
| 0.5 | 5.5 t |

As evident from Table 2, the crack generation load gets saturated in a range lower than 0.6 of the ratio of the width of groove bottom plane to the width of groove surface plane. That is, it is evident that the lowering of the ratio of the width of groove bottom plate to the width of groove surface plane to a value lower than 0.6 only causes the cross-sectional area of the gas communication grooves to decrease, and causes pressure loss to increase, without obtaining a mechanical strength effect. Accordingly, the ratio of the width of groove bottom plane to the width of groove surface plane is preferred to be not lower than 0.6.

EXAMPLE 4

According to the present Example 4, a fuel cell was made in the same manner as in Example 1 basically, except that here the structure was partially changed in the following points.

That is, a cooling member was provided for every 2 unit cells with MEA 1. Each cooling member was structured by a composite separator plate made by combining 2 electrically conductive separator plates. More specifically, firstly, a cathode side separator plate was made, which had, on one surface thereof, grooves for communicating air, and had, on the other surface thereof, grooves for communicating cooling water. Further, one anode side separator plate was made, which had, on one surface thereof, grooves for communicating a fuel gas, and had, one the other surface thereof, grooves for communicating cooling water. These two separator plates were attached to each other via sealing members in a manner that both surfaces having grooves for cooling medium are contacted with each other, thereby to form a cooling member.

Then, MEAs in 50 unit cells were stacked, and the electrically conductive separator plates 5ae, 5be positioned at both ends of the cell stack was made to have a thickness of 5 mm. The cell stack was provided with current collecting plates 8a, 8b and insulating plates 9a, 9b, and was tightened, with a pressure of 20 kgf/cm$^2$, by end plates 10a, 10b made of stainless steel, tightening rods 11a, 11b and tightening bolts and others, thereby to make a fuel cell according to the present Example 4.

For comparison, a fuel cell, as a comparative example, was made by changing the thickness of the electrically conductive separator plates at both ends of the thus made fuel cell of the present Example 4 to those having a thickness of 3 mm, which is the same as that of the electrically conductive separator plates at the other middle portion thereof.

The thus made respective fuel cells were again disassembled, and the electrically conductive separator plates at both ends thereof were observed. Thereby it was found that small cracks were generated there in the fuel cell of the comparative example, although they were not so serious cracks as to cause gas leakage. The reason for this crack generation is that a concentrated load was likely to be imposed on them at peripheries of manifolds. On the other hand, no cracks were observed in the case of the fuel cell according to the present Example 4.

The thus made 2 kinds of fuel cells according to the present Example 4 and to the comparative example were kept at 85° C., and a hydrogen gas humidified and heated to have a dew point of 83° C. was supplied to one electrode side, while air humidified and heated to have a dew point of 78° C. was supplied to the other electrode side. These fuel cells were subjected to a durability test under the conditions of a fuel utilization rate of 80%, an oxygen utilization rate of 40%, and a current density of 0.3 A/cm². The results of the test are shown in FIG. 10.

Figure 10:
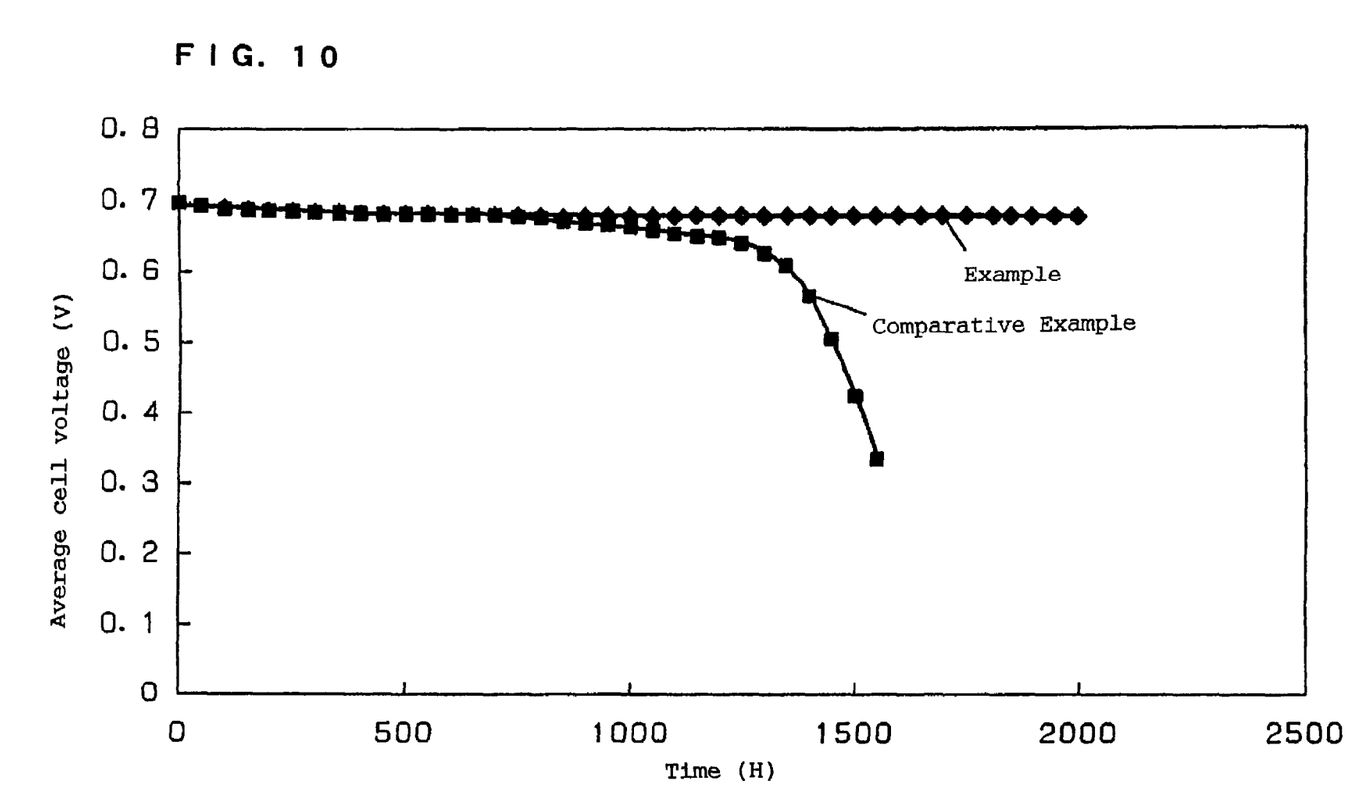
FIG. 10 is a graph showing variations, with time, of average cell voltages of the fuel cells according to Example 4 and its Comparative Example under a durability test thereof.

As apparent from FIG. 10, the average cell voltage, i.e. cell performance, of the fuel cell according to the comparative example starts lowering at a time point of about 1000 hours after the start of the test. After the durability tests for these 2 kinds of fuel cells were finished, the tightening pressure was released, and the conditions of the electrically conductive separator plates at both ends thereof were observed. As a result, cracks having grown to possibly cause the gases or the cooling medium to leak therethrough were observed at peripheries of the manifold openings. The cause of this growth is that cracks generated at the initial tightening advanced, as time passed, due to distortions by e.g. heat. On the other hand, in the case of the fuel cell according to the present Example 4, damages of e.g. cracks were not generated because the electrically conductive separator plates at both ends thereof were made thicker to have an increased strength, whereby improvements of durability and safety of the fuel cell could be confirmed.

In the present Example 4, an attempt was made to change and increase the thickness of the electrically conductive separator plates at both ends to 5 mm from 3 mm. However, as another method, the strength thereof can be increased by stacking plural electrically conductive separator plates. Thus, presence or absence of crack generation similar to that as described was studied by varying the thickness and number of electrically conductive separator plates at both ends. Here, the electrically conductive separator plates in the middle portion of the cell stack were made to have a thickness of 3 mm. The results thereof are listed in Table 3.

TABLE 3

| Electrically conductive separator plates at both ends | | Effect (presence/absence of cracks) |
| --- | --- | --- |
| Thickness of separator plate | 3 mm | Present |
| | 4 mm | Absent |
| | 5 mm | Absent |
| | 6 mm | Absent |
| Number of separator plates | 1 | Present |
| | 2 | Absent |
| | 3 | Absent |

As evident from this Table 3, effect of suppressing cracks can be obtained by increasing the thickness of the electrically conductive separator plates or by stacking plural ones of them.

EXAMPLE 5

A fuel cell according to the present Example 5 was made and measured in the same manner as in Example 4, except that here reinforcing members 16a, 16b made of stainless steel were attached, using sealing members, to peripheries of manifold openings 13a, 13b for oxidant gas, manifold openings 14a, 14b for fuel cell (sic fuel gas) and manifold openings 15a, 15b for cooling medium in the electrically conductive separator plate at both ends as shown by one example of FIG. 6, with the other fuel cell structure and conditions for evaluating characteristics of the fuel cell being all made the same as those in Example 4.

Consequently, in the durability test for 2000 hours, no lowering of cell performance was observed. Further, when the fuel cell was disassembled thereafter and the electrically conductive separator plates at both ends thereof were observed, no damages such as cracks were observed, whereby improvements of durability and safety of the fuel cell could be confirmed. Although stainless steel was used here as a material for the reinforcing members 16a, 16b, any other kinds of materials can be used if they have a function of reinforcement. In the present Example, other materials were also used, in place of stainless steel, such as aluminum, glass fiber, carbon fiber, PPS resin and phenol resin. Improvements of durability and safety of the fuel cell could be confirmed even with the use of these materials.

According to the present Example, an attempt was made to attach a reinforcing member to a periphery of each manifold opening, but it is also possible to attach an electrically conductive reinforcing member to a whole surface of the separator plate.

EXAMPLE 6

According to the present Example 6, a stainless steel having a thickness of 3 mm was used for electrically conductive separator plates at both ends. The electrically conductive separator plates were machined to have a shape in a manner similar to that as in Example 1, in which the isotropic graphite material was machined. The other fuel cell structure and conditions for evaluating characteristics of the fuel cell here were all made the same as those in Example 4. Here, stainless steel was used for the material of the electrically conductive separator plates at both ends, but any electrically conductive materials having a high strength can be used therefor, irrespectively of the kinds of the materials.

Consequently, in the durability test for 2000 hours, no lowering of cell performance was observed. Further, when the fuel cell was disassembled thereafter and the electrically conductive separator plates at both ends thereof were observed, no damages such as cracks were observed, whereby improvements of durability and safety of the fuel cell could be confirmed.

INDUSTRIAL APPLICABILITY

As evident from the foregoing, according to the present invention, the problems as to mechanical strength of electrically conductive separator plates in a polymer electrolyte fuel cell can be easily solved, whereby quality improvement, small size and lost cost of a fuel cell can be realized.

The invention claimed is:

1. A polymer electrolyte fuel cell comprising a cell stack including plural electrically conductive separator plates and electrolyte membrane-electrode assemblies inserted among said electrically conductive separator plates, wherein each of said electrolyte membrane-electrode assemblies comprises a hydrogen ion conductive polymer electrolyte membrane together with an anode and a cathode to sandwich said hydrogen ion conductive polymer electrolyte membrane, wherein each of said electrically conductive separator plates comprises plural striated gas communication grooves on one main surface thereof for supplying and exhausting a fuel gas to and from said anode, and plural striated gas communication grooves on the other main surface thereof for supplying and exhausting an oxidant gas to and from said cathode, wherein said gas communication grooves on one of said main surfaces out of both of said gas communication grooves of said each of said electrically conductive separator plates are arranged to correspond to ribs among said gas communication grooves on the other of said main surfaces, and wherein said gas communication grooves for supplying and exhausting said fuel gas to and from said anode of said each of said electrolyte membrane-electrode assemblies are positioned to correspond to ribs among said gas communication grooves for supplying and exhausting said oxidant gas to and from said cathode of said each of said electrolyte membrane-electrode assemblies; and     wherein with respect to said each of said electrically conductive separator plates, a width of each of said ribs Wr and a width of each of said gas communication grooves Wg on said one main surface, and a width of each of said ribs Wr' and a width of each of said gas communication grooves Wg' on said other main surface respectively satisfies the equations:

$1 < Wr/Wg < 1.4$, and $1 < Wr'/Wg' < 1.4$.

2. The polymer electrolyte fuel cell according to claim 1, wherein with respect to said each of said electrically conductive separator plates, widths of bottom planes of said both of said gas communication grooves are respectively smaller than widths of surface planes of said both of said gas communication grooves.

3. The polymer electrolyte fuel cell according to claim 1, wherein substantially all of said electrically conductive separator plates have a same shape, and wherein neighboring ones of said electrically conductive separator plates are arranged to be directed to a same direction on said main surfaces of said electrically conductive separator plates.

4. The polymer electrolyte fuel cell according to claim 1, wherein with respect to said each of said electrically conductive separator plates, widths of bottom planes of said both of said gas communication grooves are respectively smaller than but not smaller than 0.6 times widths of surface planes of said both of said gas communication grooves.

5. The polymer electrolyte fuel cell according to claim 1, wherein among said plural electrically conductive separator plates, those electrically conductive separator plates placed at both ends of said cell stack have mechanical strengths higher than those of the other electrically conductive separator plates.

6. The polymer electrolyte fuel cell according to claim 5, wherein said those electrically conductive separator plates placed at said both ends of said cell stack among said plural electrically conductive separator plates are made to have thicknesses larger than those of said other electrically conductive separator plates.

7. The polymer electrolyte fuel cell according to claim 5, wherein reinforcing members having a carbon material or a metal material as a constituting element thereof are added to said those electrically conductive separator plates placed at said both ends.

8. A polymer electrolyte fuel cell comprising a cell stack including plural electrically conductive separator plates and electrolyte membrane-electrode assemblies inserted among said electrically conductive separator plates, wherein each of said electrolyte membrane-electrode assemblies comprises a hydrogen ion conductive polymer electrolyte membrane together with an anode and a cathode to sandwich said hydrogen ion conductive polymer electrolyte membrane, wherein each of said electrically conductive separator plates comprises plural striated gas communication grooves on one main surface thereof for supplying and exhausting a fuel gas to and from said anode, and plural striated gas communication grooves on the other main surface thereof for supplying and exhausting an oxidant gas to and from said cathode, wherein said gas communication grooves on one of said main surfaces out of both of said gas communication grooves of said each of said electrically conductive separator plates are arranged to correspond to ribs among said gas communication grooves on the other of said main surfaces, and wherein substantially all of said electrically conductive separator plates have a same shape, and wherein neighboring ones of said electrically conductive separator plates are arranged to be alternately rotated 180 degrees on said main surfaces of said electrically conductive separator plates.

* * * * *